United States Patent [19]

El-Hefnawi et al.

[11] Patent Number: 5,183,847

[45] Date of Patent: Feb. 2, 1993

[54] MODIFIED CARBOXYLATED ROSIN POLYAMIDE/ACRYLICS

[75] Inventors: Sobhy El-Hefnawi, Brooklyn, N.Y.; Shailesh C. Shah, Paramus; Basil Wasyliw, Newark, both of N.J.

[73] Assignee: BASF Corporation, Parsippany, N.J.

[21] Appl. No.: 247,201

[22] Filed: Sep. 21, 1988

[51] Int. Cl.$^5$ .................... C09F 1/00; C09F 1/04
[52] U.S. Cl. .................... 525/54.44; 527/600; 527/604; 528/345; 524/819; 525/183
[58] Field of Search ............ 527/600, 604; 525/183, 525/54.44; 528/345; 524/819

[56] References Cited

U.S. PATENT DOCUMENTS

| | | | |
|---|---|---|---|
| 4,092,283 | 5/1978 | Oishi et al. | 527/600 |
| 4,322,326 | 3/1982 | Pyle | 525/54.44 |
| 4,552,592 | 11/1985 | Rudolphy et al. | 525/54.44 |
| 4,690,712 | 9/1987 | Janusz | 527/600 |
| 4,707,528 | 11/1987 | Koizumi et al. | 527/600 |
| 4,713,415 | 12/1987 | Lavengood et al. | 525/183 |
| 4,714,728 | 12/1987 | Graham et al. | 525/54.44 |
| 4,767,835 | 8/1988 | Janusz | 527/600 |

*Primary Examiner*—John Kight, III
*Assistant Examiner*—Dennis R. Daley
*Attorney, Agent, or Firm*—Michael R. Chipaloski

[57] ABSTRACT

Alkali-soluble resins, their preparation and use are disclosed herein. The resins are carboxylated polyamide/acrylic resins and are synthesized in a two-step fusion process in which a polyamide is first condensed with a carboxylated rosin and this intermediate product is then further condensed with an acrylic or styrene/acrylic copolymer.

6 Claims, No Drawings

MODIFIED CARBOXYLATED ROSIN POLYAMIDE/ACRYLICS

FIELD OF THE INVENTION

The present invention relates to new compositions and especially to new alkali-soluble resins, their preparation and use.

DESCRIPTION OF THE PRIOR ART

The modification of synthetic polyamide products of high average molecular weight, such as fibers, films and fabrics composed of nylon, as well as of natural polyamide products such as wool, silk, and natural leather, by means of a graft polymerization treatment, particularly with acrylic and methacrylic acids, has been described in various references such as U.S. Pat. Nos. 3,297,471, 4,369,036 and 3,188,228. The objective of these patents is to impart on the crystalline, solvent insoluble polyamide product desirable properties such as hydroscopicity, thermal stability, antistatic properties, and soil resistance, without essentially changing the solubility properties of the polyamide. This is achieved by grafting of the acrylic materials, at various levels of efficiency onto the polyamide product by either chemical or physical processes, followed by the removal of un-grafted acrylic oligomers and (co) polymers as well as of unreacted acrylic monomers.

In related corresponding application U.S. Ser. No. 69,568 filed Jul. 6, 1977 a process for modifying a polyamide resin is disclosed by reaction of a polyamide with an additional polymerizable monomer in the presence of at least 3% by weight of the total monomers of organic peroxide or the free radical initiating equivalent thereof at the reaction temperature, which preferably is in the range from about 100° C. to about 130° C. This reaction leads to a reaction mixture containing a blend of resinous materials, including unreacted polyamide resin, a novel graft polymer, and associatively-formed but un-grafted addition polymer. The graft polymer has a polyamide resin component that has an addition polymer component grafted onto it at aliphatic backbone carbons of the polyamide resin that have either one or two hydrogens bonded thereto in the ungrafted state.

This prior grafting polymerization technique has resulted in the preparation of modified polyamides useful in ink formulations. However, these polyamides have been found to suffer from some residual toxicity due to residual monomers as well as the presence of some residual peroxide catalyst decomposition products. In addition, these products were not compatible with commercially available water-based ink resins which contained styrenated acrylic solution resins.

In related patent application Ser. No. 241,533 filed Sep. 7, 1988 entitled Modifed Polyamide Compositions and Processes carboxylated polyamides are disclosed and claimed.

SUMMARY OF THE INVENTION

We have now found that a process utilizing condensation chemistry can be used in the synthesis of modified polyamides with a wider range of compatibilities for use in printing ink applications. The modified polyamides can be described as acrylic and styrenated acrylic modified polyamides. These are compatible with acrylic or styrene/acrylic pigment bases and resin supported latices that are widely used in the formulation of aqueous inks for plastics, paper and foil substrates.

The present invention utilizes as starting materials amorphous low molecular weight polyamides or relatively high molecular weight hot melt polyamide adhesives that are widely used in the preparation of organic solvent based printing inks for printing on polyolefin surfaces and the like. The use of polyamides, etc. in water-based inks has been restricted because the usual polyamide resin is not water reducible.

It is, therefore, one object of the present invention to disclose a process for the modification of commercially available polyamides, especially those useful as vehicles in solvent laminating inks, the solvent inks for surface printing on plastic films and/or pigment dispersion by condensing them with polyelectrolyte, carboxyl-terminated rosins and/or styrenated acrylics to make them waterborne, and, therefore, suitable as vehicles in aqueous ink systems.

Yet still another object is to produce modified polyamides with increased glass transition temperature to improve their heat and block resistance. These and other objects are achieved according to the following detailed description of the invention.

The resins of the present invention are prepared by a fusion process utilizing the condensation chemistry, such as amidation, imidation or transamidation. The polyamide of choice is fused in a desired ratio, at an elevated temperature, preferably at 200°–240° C. range, with one or more carboxylic resin polyelectrolytes, such as maleated, fumarated, itaconated or acrylated rosins, styrene/maleic resins, acrylic resins, styrene-acrylic acid copolymers, styrene-alpha-methyl styrene-acrylic acid copolymers, citric acid, etc. The fusion reaction is carried on long enough to produce a new carboxylated resin (reaction product) that can be neutralized by ammonia and/or amines and dissolved or dispersed in water, or in a compliant water/alcohol solution. The reaction product has a weight average molecular weight of from about 1,000 to 200,000 and more preferably from about 1,500 to about 40,000.

The reaction product is preferably synthesized in a two-step fusion process in which a polyamide is first condensed with a carboxylated rosin, such as maleated or fumarated rosin, and this intermediate product is then further condensed with an acrylic or styrene/acrylic copolymer resin polyelectrolyte.

Thus, in addition, to acquiring useful properties of the rosin, such as high gloss and water resistance, the polyamide is made compatible with the aqueous pigment bases that contain acrylic or styrene/acrylic carboxylic polyelectrolyte pigment dispersants, commonly used by the ink industry.

The compatibility of the carboxylated polyamide acrylics with the acrylic pigment bases greatly extends the usefulness and application scope of the modified carboxylated polyamide, as related in the patent application Ser. No. 241,533 entitled Modified Polyamide Compositions and Processes.

In addition, the modified polyamide-acrylics described here are compatible with a large number of ink vehicles available from various suppliers which contain styrenated acrylic solution resins.

The applications in which the resins of the present invention can be used include vehicles for aqueous or solvent flexo/gravure ink systems, such as extrusion, adhesive and thermal laminating inks and the inks for surface printing on a variety of plastic films and overprint varnishes. They can also be applied in the solvent or water ink systems as pigment dispersants. In publication gravure, the resins of this invention can be utilized in high hold-out inks for printing on uncoated, lightweight paper stock.

The following examples are illustrative of the principle and practice of this invention although not limited thereto. Parts and percentages are parts and percentages by weight.

In the following examples Morez 100 is styrene/acrylic polymer and Joncryl 80 is a combination of styrene/acrylic copolymer and acrylic polymer.

EXAMPLE 1

|   | Parts/Weight |   |
|---|---|---|
| A | 5.67 | Gum Rosin (WW) |
| B | 1.33 | Maleic Anhydride |
| C | 21.00 | Polyamide |
| D | 7.00 | Morez 100 |
| E | 4.46 | Ammonia (29%) |
| F | 60.54 | Deionized Water |
|   | 100.00 |   |

The laboratory reactor was charged with A. Heat and nitrogen were turned on. When A was partially melted, the agitation was carefully applied to avoid charring. When A was all fluid, B was added at about 120°-130° C. with the heat turned off. The temperature rose spontaneously to about 160°-175° C. Heat was reapplied and the temperature was raised to 200° C. It was kept at this level for 2 hours. Item C was then gradually charged into reactor with the heat turned on to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of this resin. After all of D was melted, the temperature was stabilized at 230° C. and kept at this level for one hour. The solution of E and F was then added carefully, with the heat and nitrogen blanket turned off, and the reflux condenser turned on. A vigorous agitation was applied. The batch went through a pasty, thick stage. Thereafter, it cleared up and the product became an aqueous solution. A sample was characterized and the batch was adjusted to the required pH and solids.

EXAMPLE #2

|   | Parts/Weight |   |
|---|---|---|
| A | 5.50 | Gum Rosin (WW) |
| B | 1.29 | Maleic Anhydride |
| C | 20.36 | Macromelt 6239 |
| D | 6.79 | Morez 100 |
| E | 5.70 | Ammonia (29%) |
| F | 60.36 | Deionized Water |
|   | 100.00 |   |

The laboratory reactor was charged with A. The heat and nitrogen were turned on. When A was partially melted, the agitation was carefully applied to avoid charring. When A was completely fluid, B was added at about 120°-130° C. with the heat turned off. The temperature rose spontaneously to about 160°-175° C. The heat was reapplied and the temperature was raised to 200° C. It was kept at this level for 2 hours. Item C was then gradually charged into reactor, with the heat turned on, to permit uninterrupted agitation and prompt melting of this resin. After all of C was melted, the temperature was raised to 230° C. and kept at this level for one hour. Item D was then gradually charged into reactor with the heat left on to permit uninterrupted agitation and prompt melting of this resin. After all of D was melted, the temperature was stabilized at 230° C. and kept at this level for one hour. The solution of E and F was then added carefully, with the heat and nitrogen blanket turned off, and the reflux condenser turned on. A vigorous agitation was applied. The batch went through a pasty, thick stage. Thereafter, it cleared up and the product became an aqueous solution. A sample was characterized and the batch was adjusted to the required pH and solids.

EXAMPLE #3

|   | Parts/Weight |   |
|---|---|---|
| A | 8.12 | Gum Rosin (WW) |
| B | 1.90 | Maleic Anhydride |
| C | 15.03 | Polyamide |
| D | 10.02 | Joncryl |
| E | 5.84 | Ammonia (29%) |
| F | 59.09 | Deionized Water |
|   | 100.00 |   |

The laboratory reactor is charged with A. The heat and nitrogen are turned on. When A is partially melted, the agitation is carefully applied to avoid charring. When A is completely fluid, B was added at about 120°-130° C. with the heat turned off. The temperature rises spontaneously to about 160°-175° C. The heat is reapplied and the temperature is raised to 200° C. It is kept at this level for 2 hours. Item C is then gradually charged into reactor, with the heat turned on, to permit uninterrupted agitation and prompt melting of this resin. After all of C is melted, the temperature is raised to 230° C. and kept at this level for one hour. Item D is then gradually charged into reactor with the heat left on to permit uninterrupted agitation and prompt melting of this resin. After all of D was melted, the temperature was stabilized at 230° C. and kept at this level for one hour. (Note: In the case that the batch at this stage should begin to gel irreversibly, add enough A to stop gellation. Abort the batch and discharge the resin). At the end of one hour hold, the solution of E and F is then added carefully, with the heat and nitrogen blanket turned off, and the reflux condenser turned on. A vigorous agitation was applied. The batch went through a pasty thick stage. Thereafter, it cleared up and the product became an aqueous solution. A sample was characterized and the batch was adjusted to the required pH and solids.

EXAMPLE #4

|   | Parts/Weight |   |
|---|---|---|
| A | 8.12 | Gum Rosin (WW) |
| B | 1.90 | Maleic Anhydride |
| C | 15.03 | Polyamide |
| D | 10.02 | Joncryl |
| E | 5.84 | Ammonia (29%) |
| F | 59.09 | Deionized Water |
|   | 100.00 |   |

A laboratory reactor was charged with A. The heat and nitrogen were turned on. When A was partially melted, the agitation was carefully applied to avoid charring. When A was completely fluid, B was added at about 120°-130° C. with the heat turned off. The temperature rose spontaneously to about 160°-175° C. The heat was reapplied and the temperature was raised to 200° C. It was kept at this level for 2 hours. Item C was then charged into reactor, with the heat turned on, to permit uninterrupted agitation and prompt melting of this resin. After all of C was melted, the temperature was raised to 230° C. and kept at this level for one hour. Item D was then gradually charged into reactor with the heat left on to permit uninterrupted agitation and prompt melting of this resin. After all of D was melted, the temperature was stabilized at 230° C. and kept at this level for one hour. The solution of E and F was then added carefully, with the heat and nitrogen blanket turned off, and the reflux condenser turned on. A vigorous agitation was applied. The batch went through a pasty, thick stage. Thereafter, it cleared up and the product became an aqueous solution. A sample was characterized and the batch was adjusted to the required pH and solids.

EXAMPLE #5

|   | Parts/Weight |   |
|---|---|---|
| A | 5.67 | Gum Rosin (WW) |
| B | 1.33 | Maleic Anhydride |
| C | 21.00 | Polyamide |
| D | 7.00 | Morez 100 |
| E | 0.49 | Ammonia (29%) |
| F | 6.51 | Deionized Water |
| G | 8.00 | Isopropyl Alcohol |
| H | 3.51 | Ammonia (29%) |
| I | 46.49 | Deionized Water |
|   | 100.00 |   |

The laboratory reactor was charged with A. The heat and nitrogen were turned on. When A was partially melted, the agitation was carefully applied to avoid charring. When A was completely fluid, B was added at about 120°-130° C. with the heat turned off. The temperature rose spontaneously to about 160°-175° C. The heat was reapplied and the temperature was raised to 200° C. It was kept at this level for 2 hours. Item C was then charged intoreactor, with the heat left on, to permit uninterrupted agitation and prompt melting of this resin. After all of C was melted, the temperature was raised to 230° C. and kept at this level for one hour. Item D was then gradually charged into reactor with the heat left on to permit uninterrupted agitation and prompt melting of this resin. After all of D was melted, the temperature was stabilized at 230° C. and kept at this level for one hour. The solution of E and F was then added carefully, with the heat and nitrogen blanket turned off, and the reflux condenser turned on. A vigorous agitation was applied. The batch went through a pasty, thick stage. The temperature at this stage was around 80° C. Item G was then added, with caution. (If the temperature were too high the alcohol would boil. After liquefaction in the condenser, it would return to the surface of the batch and form a lake on top of it). After a thorough mixing, to achieve uniformity, the batch was transferred to another reactor that contained the solution of H and I preheated to 75° C. An efficient agitation was applied. A sample was characterized. The batch was adjusted to the required pH and solids.

EXAMPLE #6

|   | Parts/Weight |   |
|---|---|---|
| A | 10.53 | Gum Rosin (WW) |
| B | 2.47 | Maleic Anhydride |
| C | 39.00 | Polyamide |
| D | 13.00 | Morez 100 |
| E | 2.24 | Ammonia (29%) |
| F | 9.00 | Deionized Water |
| G | 5.18 | Ammonia (28%) |
| H | 18.58 | n-Propylalcohol |
|   | 100.00 |   |

The laboratory reactor was charged with A. The heat and nitrogen were turned on. When A was partially melted, the agitation was carefully applied to avoid charring. When A was completely fluid, B was added at about 120°-130° C. with the heat turned off. The temperature rose spontaneously to about 160°-175° C. The heat was reapplied and the temperature was raised to 200° C. It was kept at this level for 2 hours. Item C was then charged intoreactor, with the heat left on, to permit uninterrupted agitation and prompt melting of this resin. After all of C was melted, the temperature was raised to 230° C. and kept at this level for one hour. Item D was then gradually charged into reactor, with the heat left on to permit uninterrupted agitation and prompt melting of this resin. After all of D was melted, the temperature was stabilized at 230° C. and kept at this level for one hour. The solution of E and F was then added carefully, to avoid solidification of the molten resin or excessive foaming. The heat and nitrogen were turned off and the reflux condenser was turned on. A vigorous agitation was applied. The batch went through a pasty, thick stage. When the temperature was 90° C., or lower item, G was added cautiously to avoid excessive foaming. When the batch temperature was below 88° C. (boiling point of n-propyl alcohol/water azeotrope), item H was added gradually, with vigorous agitation. A sample was characterized. The batch was adjusted to the required pH and solids.

EXAMPLE #7

|   | Parts/Weight |   |
|---|---|---|
| A | 13.00 | Unirez 710 |
| B | 39.00 | Polyamide |
| C | 13.00 | Morez 100 |
| D | 3.72 | Ammonia (29%) |
| E | 12.70 | Deionized Water |
| F | 18.58 | n-Propylalcohol |
|   | 100.00 |   |

The laboratory reactor was charged with A. The heat and nitrogen were turned on. When A was partially melted, the agitator was carefully applied to avoid charring. When A was completely melted, item B was charged into reactor, with the heat left on, to permit uninterrupted agitation and prompt melting of the resin. After all of B was melted, the temperature was raised to 230° C. and kept at this level for one hour. Item C was then gradually charged into reactor, with the heat left on, to permit uninterrupted agitation and prompt melting of this resin. After all of C was melted, the temperature was stabilized at 230° C. and kept at this level for one hour. The batch was then cast, let cool to room temperature and characterized.

The chunks of the resin were recharged into reactor. The solution of D, E and F was added. A mild heat was applied. The agitation was started as soon as possible (below the boiling point of the solution). The temperature was raised to about 70°–80° C. and kept constant. When all of the resin was dissolved, a sample was taken and characterized. The solids and pH were adjusted. The batch was cooled and cast.

EXAMPLE #8

| | Parts/Weight | |
|---|---|---|
| A | 13.00 | Unirez 710 |
| B | 39.00 | Polyamide |
| C | 13.00 | Morez 100 |
| D | 3.71 | Ammonia (29%) |
| E | 12.71 | Deionized Water |
| F | 18.58 | n-Propylalcohol |
| | 100.00 | |

The laboratory reactor was charged with A. The heat and nitrogen were turned on. When A was partially melted, the agitator was carefully applied to avoid charring. When A was completely melted, Item B was charged into reactor, with the heat left on, to permit uninterrupted agitation and prompt melting of the resin. After all of B was melted, the temperature was raised to 230° C. and kept at this level for one hour. Item C was then gradually charged into reactor, with the heat left on, to permit uninterrupted agitation and prompt melting of this resin. After all of C was melted, the temperature was stabilized at 230° C. and kept at this level for one hour. The solution of D and E was then added carefully, to avoid solidification of the molten resin or excessive foaming. The heat and nitrogen were turned off and the reflux condenser was turned on. A vigorous agitation was applied. The batch went through a pasty, thick stage. When the batch temperature was below 88° C. (boiling point of n-propyl alcohol/water azeotrope), item F was added gradually, with vigorous agitation. A sample was characterized. The batch was adjusted to the required pH and solids.

EXAMPLE #9

| | Parts/Weight | |
|---|---|---|
| A | 10.53 | Gum Rosin |
| B | 2.47 | Maleic Anhydride |
| C | 39.00 | Polyamide |
| D | 13.00 | Morez 100 |
| E | 3.72 | Ammonia (29%) |
| F | 12.70 | Deionized Water |
| G | 18.58 | Isopropylalcohol |
| | 100.00 | |

The laboratory reactor was charged with A. The heat and nitrogen were turned on. A was partially melted. The agitation was carefully applied to avoid localized charring. When A was completely fluid, B was added at about 120°–130° C. with the heat turned off. The temperature rose spontaneously to about 160°–175° C. The heat was reapplied and the temperature was raised to 200° C. It was kept at this level for two hours. Item C was then charged into reactor, with the heat left on, to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of this resin. After all of D was melted, the temperature was stabilized at 230° C. and kept at this level for one hour. The solution of E and F was then added carefully, to avoid solidification of the molten resin or excessive foaming. The heat and nitrogen were turned off and the reflux condenser was turned on. A vigorous agitation was applied. The batch passed through a pasty, thick stage. When the batch temperature was below 80° C. (boiling point of isopropyl alcohol/water azeotrope), item G was added gradually, with vigorous agitation. A sample was characterized. The batch was adjusted to the required pH and solids.

EXAMPLE #10

| | Parts/Weight | |
|---|---|---|
| A | 10.53 | Gum Rosin |
| B | 2.47 | Maleic Anhydride |
| C | 39.00 | Versamid 930 |
| D | 13.00 | Morez 100 |
| E | 3.72 | Ammonia (29%) |
| F | 12.70 | Deionized Water |
| G | 18.58 | Isopropyl Alcohol |
| | 100.00 | |

The laboratory reactor was charged with A. The heat and nitrogen were turned on. A was partially melted. The agitation was carefully applied to avoid localized charring. When A was completely fluid, B was added at about 120°–130° C. with the heat turned off. The temperature rose spontaneously to about 160°–175° C. The heat was reapplied and the temperature was raised to 200° C. It was kept at this level for two hours. Item C was then charged into reactor, with the heat left on, to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of this resin. After all of D was melted, the temperature was stabilized at 230° C. and kept at this level for one hour. The solution of E and F was then added carefully, to avoid solidification of the molten resin or excessive foaming. The heat and nitrogen were turned off and the reflux condenser was turned on. A vigorous agitation was applied. The batch passed through a pasty, thick stage. When the batch temperature was below 80° C. (boiling point of isopropyl alcohol/water azeotrope), item G was added gradually, with vigorous agitation. A sample was characterized. The batch was adjusted to the required pH and solids.

EXAMPLE #11

| | Parts/Weight | |
|---|---|---|
| A | 10.53 | Gum Rosin |
| B | 2.47 | Maleic Anhydride |
| C | 39.00 | Unirez 2224 |
| D | 13.00 | Morez 100 |
| E | 3.72 | Ammonia (29%) |
| F | 12.70 | Deionized Water |
| G | 18.58 | Isopropyl Alcohol |
| | 100.00 | |

The laboratory reactor was charged with A. The heat and nitrogen were turned on. A was partially melted.

The agitation was carefully applied to avoid localized charring. When A was completely fluid, B was added at about 120°–130° C. with the heat turned off. The temperature rose spontaneously to about 160°–175° C. The heat was reapplied and the temperature was raised to 200° C. It was kept at this level for two hours. Item C was then charged into reactor, with the heat left on, to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of this resin. After all of D was melted, the temperature was stabilized at 230° C. and kept at this level for one hour. The solution of E and F was then added carefully, to avoid solidification of the molten resin or excessive foaming. The heat and nitrogen were turned off and the reflux condenser was turned on. A vigorous agitation was applied. The batch passed through a pasty, thick stage. When the batch temperature was below 80° C. (boiling point of isopropyl alcohol/water azeotrope), item G was added gradually, with vigorous agitation. A sample was characterized. The batch was adjusted to the required pH and solids.

EXAMPLE #12

| | Parts/Weight | |
|---|---|---|
| A | 10.53 | Gum Rosin |
| B | 2.47 | Maleic Anhydride |
| C | 39.00 | Versamid 900 |
| D | 13.00 | Morez 100 |
| E | 3.72 | Ammonia (29%) |
| F | 12.70 | Deionized Water |
| G | 18.58 | Isopropyl Alcohol |
| | 100.00 | |

The laboratory reactor was charged with A. The heat and nitrogen were turned on. A was partially melted. The agitation was carefully applied to avoid localized charring. When A was completely fluid, B was added at about 120°–130° C. with the heat turned off. The temperature rose spontaneously to about 160°–175° C. The heat was reapplied and the temperature was raised to 200° C. It was kept at this level for two hours. Item C was then charged into reactor, with the heat left on, to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of this resin. After all of D was melted, the temperature was stabilized at 230° C. and kept at this level for one hour. The solution of E and F was then added carefully, to avoid solidification of the molten resin or excessive foaming. The heat and nitrogen were turned off and the reflux condenser was turned on. A vigorous agitation was applied. The batch passed through a pasty, thick stage. When the batch temperature was below 80° C. (boiling point of isopropyl alcohol/water azeotrope), item G was added gradually, with vigorous agitation. A sample was characterized. The batch was adjusted to the required pH and solids.

EXAMPLE #13

| | Parts/Weight | |
|---|---|---|
| A | 10.17 | Unitol NCY |
| B | 2.83 | Fumaric Acid |
| C | 39.00 | Polyamide |
| D | 13.00 | Morez 100 |
| E | 7.42 | Ammonia (29%) |
| F | 9.00 | Deionized Water |
| G | 18.58 | n-Propyl Alcohol |
| | 100.00 | |

The laboratory reactor was charged with A. The heat and nitrogen were turned on. When A was partially melted, the agitation was carefully applied to avoid localized charring. When A was completely melted, B was added at about 130°–140° C. The temperature was raised to 200° C. It was kept at this level for two hours and fifteen minutes. Item C was then charged into reactor with the heat left on to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of the resin. After all of D was melted, the temperature was stabilized at 230 C and kept at this level for one hour. The batch was then cast and cooled to room temperature.

The resin was broken to chunks and recharged into reactor. The solution of E, F and G is added. The mixture was then heated carefully to 80° C. and agitation was started as soon as possible. The agitation was kept on, until all of the solid resin was dissolved. A sample was taken and characterized. Adjustments were made in solids and pH. The product was then cast.

EXAMPLE #14

| | Parts/Weight | |
|---|---|---|
| A | 13.00 | Acintol |
| B | 39.00 | Polyamide |
| C | 13.00 | Morez 100 |
| D | 8.15 | Ammonia (29%) |
| E | 8.27 | Deionized Water |
| F | 18.58 | n-Propyl Alcohol |
| | 100.00 | |

The laboratory reactor was charged with A. The heat and nitrogen were turned on. When A was partially melted, the agitation was carefully applied to avoid charring. When A was completely melted, item B was charged into reactor, with the heat left on, to permit uninterrupted agitation and prompt melting of the resin. After all of B was melted, the temperature was raised to 230° C. and kept at this level for one hour. Item C was then gradually charged into reactor, with the heat left on, to permit uninterrupted agitation and prompt melting of the resin. After all of C was melted the temperature was stabilized at 230° C. and kept at this level for one hour. The batch was then cast and cooled to room temperature.

The resin was broken to chunks and recharged into reactor. The solution of D, E and F was added. The mixture was then heated carefully to 80° C. and agitation was started as soon as possible. The agitation was kept on, until all of the solid resin was dissolved. A sample was taken and characterized. Adjustments were made in solids and pH. The product was then cast.

EXAMPLE #15

| | Parts/Weight | |
|---|---|---|
| A | 16.80 | Acintol |
| B | 2.70 | Maleic Anhydride |
| C | 32.50 | Polyamide |
| D | 13.00 | Morez 100 |
| E | 10.17 | Ammonia (29%) |
| F | 6.25 | Deionized Water |
| G | 18.58 | n-Propyl Alcohol |
| | 100.00 | |

The laboratory reactor was charged with A. The heat and nitrogen were turned on. When A was partially melted, the agitation was carefully applied to avoid localized charring. When A was completely melted, B was added at about 130°–140° C. The temperature was raised to 200° C. It was kept at this level for two hours and fifteen minutes. Item C was then charged into reactor with the heat left on to permit uninterrupted agitation and prompt melting of this resin. After all of C was melted, the temperature was raised to 230° C. and kept at this level for one hour. Item D was then gradually charged into reactor, with the heat left on, to permit uninterrupted agitation and prompt melting of the resin. After all of D was melted, the temperature was stabilized at 230° C. and kept at this level for one hour. The batch was then cast and cooled to room temperature.

The resin was broken to chunks and recharged into reactor. The solution of E, F and G was added. The mixture was then heated carefully to 80° C. and agitation was started as soon as possible. The agitation was kept on, until all of the solid resin was dissolved. A sample was taken and characterized. Adjustments were made in solids and pH. The product was then cast.

The following are examples of ink and coating compositions based on the preceding polyamides.

EXAMPLE #16

The following is an example of an ink suitable for printing on plastic films. The ink is suitable for lamination using an adhesive or extrusion lamination process.

| | Parts/Weight | |
|---|---|---|
| A | 14.0 | Phthalocyanine Pigment Green Shade |
| B | 4.0 | Morez 100 |
| C | 1.0 | Ammonia - 29% |
| D | 21.0 | Water |
| E | 30.0 | Polyamide - Example #1 |
| F | 20.0 | Water |
| G | 10.0 | Isopropanol |
| | 100.00 | |

Resin B is dissolved in C and D. A slurry of A is made in the above solution and passed through a high speed fine media mill to achieve a good dispersion of the pigment. The finished ink is prepared by mixing components E, F and G into the pigment dispersion.

The ink is reduced to printing viscosity using an 80/20 blend of water and n-propanol.

EXAMPLE #17

The following is an example of an ink suitable for surface printing flexible plastic films.

| | Parts/Weight | |
|---|---|---|
| A | 12.0 | AAOT Yellow Pigment |
| B | 3.5 | Joncryl 67 |
| C | 1.0 | Ammonia - 29% |
| D | 23.5 | Water |
| E | 10.0 | Polyamide - Example #9 |
| F | 20.0 | Joncryl 80 - Styrene-Acrylic Latex |
| G | 5.0 | Jonwax 120 |
| H | 15.0 | Water |
| I | 10.0 | Isopropanol |
| | 100.00 | |

Resin B is dissolved in C and D. A slurry of A is made in the preceding solution and passed through a high speed fine media mill to achieve good pigment dispersion. Components E through I are added in the stated order while mixing.

The ink is reduced to printing viscosity using an 80/20 blend of water and n-propanol.

EXAMPLE #18

The following is an example of an overprint varnish with good adhesion to many different types of substrates including coated paper, films and foils.

| | Parts/Weight | |
|---|---|---|
| A | 20.0 | Polyamide - Example #13 |
| B | 1.0 | Ammonia - 29% |
| C | 23.5 | Water |
| D | 5.0 | Microchrystalline Wax Emulsion |
| E | 40.0 | Lucidene 603 |
| F | 0.5 | Silicone Emulsion |
| G | 10.0 | Isopopoanol |
| | 100.00 | |

Mix A, B and C on a mixing tank. Add D, E, F and G in order while mixing.

The coating composition can be reduced with water or 80/20 water-n-propanol blend prior to application.

We claim,

1. An interpolymer comprising the reaction product of a polyamide, with a carboxylated rosin and acrylic or styrene/acrylic co-polymer polyelectrolyte at a temperature of 180°–250° C.

2. The reaction product of claim 1 wherein the polyamide has a weight average molecular weight of 250–50,000.

3. The reaction product of claim 1 wherein the carboxylated rosin is selected from a group consisting of maleated, fumarated, itaconated or acrylated rosins.

4. The reaction product of claim 1 wherein the acrylic or styrene/acrylic copolymer polyelectrolyte is selected from a group of resins of weight average molecular weight of 1,000–50,000 and the acid number of 50–350.

5. The reaction product of claim 3 wherein the rosin is selected from gum rosin or tall oil rosin.

6. A process of modifying a polyamide which comprises condensing a polyamide with carboxylated rosin and acrylic or styrene/acrylic copolymer polyelectrolyte at a temperature of 180°–250° C.

* * * * *